United States Patent [19]

Iwanari et al.

[11] Patent Number: 5,017,450
[45] Date of Patent: May 21, 1991

[54] COLOR TONER COMPOSITION FOR ELECTROSTATIC DEVELOPER

[75] Inventors: Yoshiyuki Iwanari, Tokyo; Shinji Amaya, Saitama; Seiichi Shimizu, Saitama; Toshiro Kogawara, Saitama, all of Japan

[73] Assignee: Dainippon Ink & Chemicals, Inc., Tokyo, Japan

[21] Appl. No.: 360,697

[22] Filed: Jun. 2, 1989

[30] Foreign Application Priority Data

Jun. 3, 1988 [JP] Japan ................. 63-135469

[51] Int. Cl.$^5$ ............... G03G 9/087; G03G 9/097
[52] U.S. Cl. .................... 430/106; 430/109; 430/110
[58] Field of Search ............... 430/106, 109, 110

[56] References Cited

U.S. PATENT DOCUMENTS

| 4,931,370 | 6/1990 | Amaya et al. | 430/109 X |
|---|---|---|---|
| 4,931,375 | 6/1990 | Akimoto et al. | 430/109 |

FOREIGN PATENT DOCUMENTS

| 58-198049 | 11/1983 | Japan | 430/109 |
|---|---|---|---|
| 61-83547 | 4/1986 | Japan | 430/109 |
| 1-156759 | 6/1989 | Japan | 430/109 |
| 1-163756 | 6/1989 | Japan | 430/109 |

*Primary Examiner*—Roland Martin
*Attorney, Agent, or Firm*—Armstrong, Nikaido, Marmelstein, Kubovcik & Murray

[57] ABSTRACT

A color toner composition for an electrostatic developer is disclosed, comprising a cyan pigment, a magenta pigment or a yellow pigment, a binder resin and a negative charging-controlling agent, wherein the binder resin is a vinyl-modified polyester resin as obtained by graft polymerizing.

(b) a vinyl monomer component containing an aromatic vinyl monomer and an amino group-containing vinyl monomer to (a) an unsaturated polyester component containing at least aliphatic unsaturated dibasic acid and polyhydric alcohol, said component (a) constituting at least 50% by weight of the vinyl-modified polyester resin and said amino group-containing vinyl monomer constitutes 0.1 to 2% by weight of the vinyl-modified polyester resin.

3 Claims, No Drawings

COLOR TONER COMPOSITION FOR ELECTROSTATIC DEVELOPER

FIELD OF THE INVENTION

The present invention relates to a negatively chargable color toner composition for use in development of electrostatic latent images in electrophotography, electrostatic recording, electrostatic printing and so forth.

BACKGROUND OF THE INVENTION

An electrophotographic method is usually a method in which an electrostatic latent image is formed on an electrostatic latent image-carrier comprising a photoconductive light-sensitive material by charging and imagewise exposure to light, and then developed with a toner composition which contains a colorant dispersed in a binder resin, and the toner image thus obtained is transferred to a support such as a transfer paper and fixed.

As such toner compositions to obtain visible images, those comprising a black colorant such as carbon black dispersed in a binder are generally used. In recent years, color toners comprising a binder resin and a blue pigment, a magenta pigment or a yellow pigment dispersed in the binder resin have been used. Among these color toners are those for obtaining polychromatic images by the electrophotographic method. Usually, blue, magenta and yellow toners are used.

In the case of such color toners, it is also required that a color image as transferred to and fixed on a sheet for an overhead projector (hereinafter referred to as "OHP") can be clearly and sharply projected on a screen.

A color toner composition generally comprises a binder resin and a colorant as main components, and various additives. Binder resins generally used are polystyrene, a styrene-(meth)acrylic acid ester copolymer, a styrene-butadine copolymer, polyester, an epoxy resin, a cumarone indene resin, and the like. In particular, a polyester resin has been began to use because it is relatively good in fixability and is good in transmittability of OHP.

A polyester resin, however, is inherently of high negative chargability and, therefore, in the case of a toner containing the polyester resin, the amount of electricity charged is increased and becomes excessive during the period of use thereof after mixing with a carrier in a developing machine. If the amount of electricity charged is increased excessively, the binding force between toner particles and carrier particles becomes strong and the toners are not used in development of an electrostatic latent image on the light-sensitive material. In some cases, they are developed in combination with carrier particles. If they are transferred to paper, for example, problems arise in that the density of transferred image is decreased and white dots are formed.

SUMMARY OF THE INVENTION

An object of the present invention is to provide a polyester resin-based color toner for an electrostatic developer which permits suitable negative charging and provides an image having high quality.

The object of the present invention can be attained with a color toner composition for an electrostatic developer comprising a cyan pigment, a magenta pigment or a yellow pigment, a binder resin and a negative charging-controlling agent, wherein the binder resin is a vinyl-modified polyester resin as obtained by graft polymerizing
  a vinyl monomer component containing an aromatic vinyl monomer and an amino group-containing vinyl monomer onto
  an unsaturated polyester component containing at least aliphatic unsaturated dibasic acid and polyhydric alcohol, and the component (a) constitutes at least 50% by weight of the total vinyl modified polyester resin and the amino group-containing vinyl monomer constitutes 0.1 to 2% by weight of the total vinyl-modified polyester resin.

DETAILED DESCRIPTION OF THE INVENTION

The vinyl-modified polyester resin of the present invention is used in combination with a negative charging-controlling agent. A color toner containing these components is mixed with a carrier substance, e.g., iron powder, iron oxide powder or ferrite magnetic powder to impart negative chargability. The vinyl-modified polyester resin contains a polymer portion of the amino group-containing monomer when it is alone and, therefore, it is materially different from those obtained by graft polymerization of a vinyl monomer not containing an amino group-containing monomer onto polyester. That is, positive chargability in which the amino group possesses can be added to negative chargability of the polyester.

As a result, a toner comprising the vinyl-modified polyester resin of the present invention and a colorant can be positively charged. By adding a negative charging-controlling agent, the amount of electricity charged which is suitable for a negatively chargable toner can be obtained. At the same time, an increase in the amount of electricity charged can be prevented even if it is used repeatedly in a developing machine. Positive chargability of the toner prior to addition of the negative charging-controlling agent can be obtained, for example, by mixing an iron powder having a thin surface oxide film and a carrier. In this case, by mixing with an iron powder having the thick surface oxide film or a resin-coated iron powder carrier, the toner can be made negatively chargable. Even in this case, since positive chargability is added by the amino group as compared with the case that the polyester is used alone, a suitable amount of electricity charged can be obtained by using a negative charging-controlling agent in combination, and even if the toner is used repeatedly in a developing machine, an excessive increase in the amount of electricity charged can be avoided.

The unsaturated polyester to be used in the present invention is a polycondensate of aliphatic dibasic acid and polyhydric alcohol. In order to obtain the toner in a powder form and from a viewpoint of fixability of the toner to paper and so forth, it is preferred that the softening point of the unsaturated polyester is from 80 to 150° C.

The polyhydric alcohol includes diol containing a propyridenediphenyl group in the molecule thereof Examples are hydrogenated bisphenol A, propylene oxide adduct of bisphenol A, and ethylene oxide adduct of bisphenol A. The average addition mole number of propylene oxide or ethylene oxide in the above oxide adducts is suitably from 2 to 7. Those adducts obtained be used. As the polyol component, diols other than the above bisphenol type diol may be added in a proportion of not more than about 10 mol % of the total polyol component. Examples of such polyols are ethylene glycol, propylene glycol, neopentyl glycol, 3,3,5-trimethyl-2,4-pentanediol and the like.

In addition, ethylene glycol, triethylene glycol, 1,2-propylene glycol, 1,3-propylene glycol, 1,4-butane diol, neopentyl glycol, 1,4-butene glycol, 1,4-bis(hydroxymethyl)cyclohexane can be used alone or in combination with one another.

The aliphatic unsaturated dibasic acid includes maleic acid, maleic anhydride, fumaric acid, itaconic acid, citraconic acid and the like. Other polyhydric carboxylic acids can be used in combination. Dibasic acids or their esters with lower alcohols, such as phthalic anhydride, terephthalic acid, isophthalic acid, o-phthalic acid, hexahydrophthalic anhydride, tetrahydrophthalic anhydride, cyclohexanedicarboxylic acid, methylcyclohexanecarboxylic acid, mesaconic acid, glutaconic acid, succinic acid, malonic acid, glutaric acid, adipic acid, azelaric acid, sebacic acid, cyclohexanedicarboxylic acid, oxalic acid, and alkyl or alkenylsuccinic acid having 4 to 18 carbon atoms can be used in combination.

In addition to the above components, trifunctional compounds such as trimellitic anhydride, glycerine or trimethylolpropane can be used in combination within the range that does not cause geling of the polyester resin. As a molecular weight-controlling agent for the unsaturated polyester, monofunctional compounds such as benzoic acid or cyclohexanol can be used appropriately.

The weight average molecular weight of the unsaturated polyester is preferably in the range of from 5,000 to 15,000. If the molecular weight is less than 5,000, the unsaturated polyester becomes brittle and its durability as a toner is decreased. On the other hand, if it is more than 15,000, geling readily occurs at the time of graft polymerization and no suitable graft polymer can be obtained.

Of the components constituting the unsaturated polyester, aliphatic unsaturated dibasic acid is an important component in that it becomes a graft active point and introduces a partially cross-linked structure into the graft polymer. The aliphatic unsaturated dibasic acid content of the unsaturated polyester resin is preferably from 0.2 to 2.0% by weight. If the content is less than 0.2% by weight, graft polymerization becomes difficult to carry out. On the other hand, if it is more than 2% by weight, geling sometimes readily occurs. As the aliphatic unsaturated dibasic acid, maleic anhydride is particularly suitable.

The above unsaturated polyester can be produced by polycondensing the carboxylic acid component and the diol component in an inert gas atmosphere at a temperature of 180° to 250° C. In this reaction, an esterification catalyst commonly used to accelerate the reaction, such as zinc oxide, stannous oxide, dibutyltin oxide, or dibutyltin dilaurate, can be used. For the same purpose, production can be carried out under reduced pressure.

To the unsaturated polyester thus produced is graft polymerized a vinyl monomer The term "vinyl monomer" as used herein includes an aromatic vinyl monomer and an amino group-containing monomer Examples of the amino group-containing vinyl monomer are dimethylaminoethyl methacrylate, diethylaminoethyl methacrylate, dimethylaminoethyl acrylate, and dimethylaminopropylmethacrylamide.

Examples of the aromatic vinyl monomer which is an essential constitutional component of the vinyl monomer are styrene, α-methylstyrene, vinyltoluene, and p-ethylstyrene.

Other vinyl monomers can be used in combination with the amino group-containing monomer and the aromatic vinyl monomer. Examples of such vinyl monomers are methacrylic acid alkyl esters such as methyl methacrylate, butyl methacrylate, octyl methacrylate, or stearyl methacrylate; acrylic acid alkyl esters such as ethyl acrylate, propyl acrylate, butyl acrylate or octyl acrylate; acrylonitrile, and acrylamide.

The above unsaturated polyester constitutes at least 50% by weight, preferably 60 to 90% by weight of the total vinyl-modified polyester resin.

The amino group-containing monomer constitutes 0.1 to 2% by weight of the total vinyl-modified polyester resin. If the proportion of the amino group-containing vinyl monomer is less than 0.1% by weight, negative chargability of the polyester is strong, and it undesirably tends to become difficult to control the charged amount of the toner containing the vinyl-modified polyester resin and the colorant as main components to a suitable level with a negative charging-controlling agent. On the other hand, if it is more than 2% by weight, positive chargability of the vinyl-modified polyester resin becomes excessively strong. Also in this case, suitable negative chargability cannot be obtained for the toner.

The graft polymerization reaction is carried out by solution polymerization or suspension polymerization. In the case of the solution polymerization method, a vinyl monomer and a polymerization initiator are added to a solution of unsaturated polyester dissolved in a solvent, e.g., xylene or toluene, and polymerization is carried out in an inert gas atmosphere at a temperature unsaturated polyester and a polymerization initiator are dissolved in a vinyl monomer and suspended or dispersed in water containing a suspension stabilizer, and polymerization is carried out in the same manner as above. Suitable examples of the polymerization initiator are azobisisobutyronitrile, azobisdimethylvaleronitrile and like azo-based initiators.

The weight average molecular weight of the vinyl-modified polyester resin to be used in the present invention is preferably 8,000 to 20,000. If necessary, a chain transfer agent, e.g., dodecylmercaptan or thiophenol can be used. If the weight average molecular weight of the polymer is less than 8,000, it sometimes becomes brittle as a binder resin and its durability as a toner is deteriorated. If it is more than 20,000, a toner composition providing good fixability and leveling (surface smoothness) is sometimes not obtained.

The glass transition temperature as determined by the differential thermal analysis of the vinyl-modified polyester resin is preferably 50° to 80° C. and more preferably 55° to 75° C. If the glass transition temperature is too low, blocking of toners readily occurs. If it is too high, fixability is reduced. In the present invention, the glass transition point is an endothermic peak temperature in differential thermal analysis.

The melt viscosity at 100° C. as determined by the flow tester method of the vinyl-modified polyester resin of the present invention is $1 \times 10^4$ to $5 \times 10^5$ poises and preferably $1 \times 10^4$ to $1 \times 10^5$ poises. If the melt viscosity is too low, anti-offset properties are reduced. On the other hand, if it is too high, when the toner is used in OHP, transmitted light is scattered because the levelling of the toner layer fixed on an OHP sheet is reduced, and there is obtained only a transmitted image which is blackish and is low in saturation.

The toner composition of the present invention is useful in a color toner, and as colorants, the following can be used.

Yellow Organic Pigments

Benzidine based pigments such as
C. I. 21090 (Pigment Yellow 12)
C. I. 21095 (Pigment Yellow 14)
C. I. 21100 (Pigment Yellow 13)
C. I. 21105 (Pigment Yellow 17)

These pigments can be used alone or in combination with each other.

Magenta Organic Pigments

Xanthene-based Pigment Red 81 (CI 45160)
Quinacridone-based 2,9-dimethylquinacridone,
Methine-based astracrokicine dye,
Thioindigo-based Vat Red 2 (CI 788655),
Azo Lake-based Brilliant Carmine 6B (CI 15850)

These can be used alone or in combination with each other.

Blue Pigments

Compounds classified into C. I. Pigment Blue 15, C. I. Pigment Blue 68 and C. I. Solvent Blue 70.

Phthalocyaine-based pigments such as C. I. Nos 74260, 74280, 74255, 74160 and 74180.

These can be used alone or in combination with each other.

| Oil Dyes |
| --- |
| C.I. Solvent Red 24 |
| C.I Solvent Violet 13 |
| C.I. Solvent Blue 7 |
| C.I. Solvent Blue 35 |
| C.I. Solvent Green 35 |
| C.I. Solvent Brown 5 |
| C.I. Solvent Yellow 2 |
| C.I. Solvent Yellow 14 |
| C.I. Solvent Orange 7 |
| C.I. Solvent Red 3 |

These can be used alone or in combination with each other.

The toner composition of the present invention contains, in addition to the vinyl-modified polyester resin and the colorant, a negative charging-controlling agent as main components. As the negative charging-controlling agent, the metal complex compounds of salicylic acid or the ester of salicylic acid and alkyl alcohol can be used.

In accordance with the present invention, as described above, positive chargability of the amino group is provided by graft polymerizing an amino group-containing vinyl monomer to a polyester resin. Use of the resin in combination with a negative charging-controlling agent avoids an excessive increase in the charged amount during the time of use depending on the type of a colorant and the type of a carrier as encountred in the toner where a polyester resin alone is used or a graft polymer of styrene to the polyester resin is used. Furthermore, electric charges having a suitable charged amount can be provided to the toner. Thus the range chosen for the colorant or carrier can be broadened, and furthermore toners having stabilized charging properties can be obtained. Thus there can be provided toners which are excellent in fixability, and are excellent in negative charging properties in connection with development of electrostatic latent images, and high quality copied images can be obtained.

The present invention is described in greater detail with reference to the following examples. All parts are by weight.

EXAMPLE 1

(Production of Vinyl-Modified Polyester Resin)

68 parts of polyoxyethylene(2)-2,2-bis(4-hydroxyphenyl)propane, 16 parts of isophthalic acid, 16 parts of terephthalic acid, 0.3 part of maleic anhydride and 0.06 part of dibutyltin oxide were placed in a flask, were reacted in a nitrogen atmosphere at 230° C. for 24 hours, and then taken out of the flask.

The weight average molecular weight of the unsaturated polyester resin as obtained above was 11,000.

50 parts of the unsaturated polyester resin and 50 parts of xylene were placed in a flask and dissolved. The temperature was raised until xylene began to reflux. While refluxing the xylene, a solution of 0.4 part of azobisisobutyronitrile dissolved in 13 parts of styrene and 0.5 part of diethylaminoethyl methacrylate was dropped in a nitrogen atmosphere over about 30 minutes. After the completion of dropwise addition, the mixture was maintained for 3 hours. After distillation under reduced pressure of xylol, the resin was taken out. A binder resin having a weight average molecular weight of 12,500, a melt viscosity at 100° C. of $7 \times 10^4$ poises, and a glass transition temperature of 63° C. was obtained.

The melt viscosity was measured by the use of a flow tester Model CFT-500 (produced by Shimazu Corp.) under conditions of nozzle diameter 1 mm, nozzle length 1 mm, load 30 kg, temperature raising speed 3° C./min (Preparation of Toner)

92 parts of the vinyl-modified polyester resin obtained above, 5 parts of phthalocyanine-based pigment C. I. No. 74160 (Fastgen Blue GNPT, produced by Dainippon Ink and Chemicals, Inc.) and 3 parts of a charging-controlling agent Bontron E-84 (produced by Orient Kagaku Kogyo Co., Ltd.) were mixed in a ball mill, kneaded with a heating roll, powdered by the use of a jet mill and sieved to obtain toners having an average particle diameter (weight average) of about 12 μm. This toner is referred to as "Toner (1)".

EXAMPLE 2

Using 92 parts of the same vinyl-modified polyester resin as used in Example 1, 5 parts of benzidine-based pigment C.I. No. 21095 (Symuler Fast Yellow 5GF, produced by Dainippon Ink and Chemicals, Inc.) and 3 parts of a charging-controlling agent Bontron E-84 (produced by Orient Kagaku Kogyo Co., Ltd.), toners were produced in the same manner as in Example 1. This toner is referred to as "Toner (2)".

EXAMPLE 3

Using 92 parts of the same vinyl-modified polyester resin as used in Example 1, 5 parts of dimethylquinachridone pigment C. I. No. 73915 (Fastgen Super Magenta R, produced by Dainippon Ink and Chemicals, Inc.) and 3 parts of a charging-controlling agent Bontron E-84 (produced by Orient Kagaku Kogyo Co., Ltd.), toners were produced in the same manner as in Example 1. This toner is referred to as "Toner (3)".

COMPARATIVE EXAMPLE 1

Using 95 parts of the same vinyl-modified polyester resin as used in Example 1, and 5 parts of phthalocyanine-based pigment C.I. No. 74160 (Fastgen Blue GNPT, produced by Dainippon Ink and Chemicals, Inc.), toners were produced in the same manner as in Example 1. This toner is referred to as "Toner (4)".

COMPARATIVE EXAMPLE 2

Using 92 parts of the polyester resin prior to graft polymerization as obtained in Example 1, 5 parts of phthalocyanine-based pigment C. I. No. 74160 (Fastgen. Blue GNPT, produced by Dainippon Ink and Chemicals, Inc.) and 3 parts of a charging-controlling agent Bontron E-84 (produced by Orient Kagaku Kogyo Co., Ltd.), toners were produced in the same manner as in Example 1. This toner is referred to as "Toner (5)".

COMPARATIVE EXAMPLE 3

Using 95 parts of the polyester resin prior to graft polymerization as obtained in Example 1, and 5 parts of a phthalocyanine-based pigment C. I. No. 74160 (Fastgen Blue GNPT, produced by Dainippon Ink and Chemicals, Inc.), toners were produced in the same manner as in Example 1. This toner is referred to as "Toner (6)".

COMPARATIVE EXAMPLE 4

A binder resin was produced in the same manner as in Example 1 except that maleic anhydride was not used. This binder resin had a weight average molecular weight of 12,000, a glass transition temperature of 62° C. and a melt viscosity at 100° C. of $5.5 \times 10^4$ poises. This binder resin was a mixture of a vinyl polymer resulting from not graft polymerization of vinyl monomer to the saturated polyester but homopolymerization of the vinyl monomer, and the saturated polyester.

Using the above binder resin, toners were produced in the same manner as in Example 1. This toner is referred to as "Toner (7)"

The above toners (1) to (7) were subjected to the following tests.

96 parts of 100 to 200 mesh iron oxide powder (DSP-128B produced by Dowa Teppun Kogyo Co., Ltd.) and 4 parts of each toner were mixed to prepare a developer. Using the developer produced above, a copying test was carried out on a partially reformed copying machine Leodry 3801 (produced by Toshiba Corp.). That is, a latent image was formed and developed, and the toner thus obtained was transferred to a transferring paper and fixed with a heating roll fixing machine to form a copied image.

In addition, 96 parts of ferrite carriers covered with an acrylic resin and having an average particle diameter of 150 to 250 mesh and 5 parts of each other were mixed to prepare a developer.

Using each developer, a copying test was carried out on a partially reformed Leodry 3301 (produced by Toshiba Corp.). That is, a latent image was formed and developed, and the toner image thus obtained was transferred to a copying paper and fixed with a heating roller fixing machine to form a copied image. The fixing machine used silicone rubber and needed coating with silicone oil.

The evaluation methods were as follows:

(1) Image Density

A Macbeth reflective densitometer RD-918 (produced by Sakata Shokai Co., Ltd.) was used, and a developed image density at an original image density of 1.3 was indicated.

(2) Fog

A Macbeth reflective densitometer RD-918 (produced by Sakata Shokai Co., Ltd.) was used. A difference between a developed image density in the white part of the original and a reflective density of the transferring paper used was evaluated by the following rating.

| Less than 0.03 | Good |
| 0.03 or more | Bad |

(3) Sharpness

With a line image chart of the original as an original, reproducability was visually judged.

(4) Amount of Electricity Charged

A 30 second blow value as measured by the use of a blow off charged amount measuring device (produced by Toshiba Chemical Co., Ltd.) was indicated.

|  |  | Iron Oxide Powder (100-200 mesh) | | Ferrite Powder covered with Acrylic Resin | |
| --- | --- | --- | --- | --- | --- |
|  |  | Initial Stage | After 1,000 Copies | Initial Stage | After 1,000 Copies |
| Toner 1 | Image Density | 1.40 | 1.42 | 1.38 | 1.37 |
|  | Fog | good | good | good | good |
|  | Sharpness | good | good | good | good |
|  | Charged Amount ($\mu$c/g) | −18 | −17 | −21 | −22 |
| Toner 2 | Image Density | 1.45 | 1.43 | 1.39 | 1.37 |
|  | Fog | good | good | good | good |
|  | Sharpness | good | good | good | good |
|  | Charged Amount ($\mu$c/g) | −17 | −18 | −20 | −21 |
| Toner 3 | Image Density | 1.44 | 1.42 | 1.41 | 1.39 |
|  | Fog | good | good | good | good |
|  | Sharpness | good | good | good | good |
|  | Charged Amount ($\mu$/g) | −19 | −20 | −22 | −23 |
| Toner 4 | Image Density | Impossible to evaluate because of vigorous scattering | | 0.94 | Impossible to evaluate because of vigorous |

-continued

| | | Iron Oxide Powder (100-200 mesh) | | Ferrite Powder covered with Acrylic Resin | |
|---|---|---|---|---|---|
| | | Initial Stage | After 1,000 Copies | Initial Stage | After 1,000 Copies |
| | Fog | Impossible to evaluate because of vigorous scattering | | bad | scattering Impossible to evaluate because of vigorous scattering |
| | Sharpness | Impossible to evaluate because of vigorous scattering | | bad | Impossible to evaluate because of vigorous scattering |
| | Charged Amount ($\mu c/g$) | −2 | Impossible to evaluate because of vigorous scattering | −8 | Impossible to evaluate because of vigorous scattering |
| Toner 5 | Image Density | 0.71 | 0.55 | 0.61 | 0.48 |
| | Fog | bad | bad | bad | bad |
| | Sharpness | bad | bad | bad | bad |
| | Charged Amount ($\mu c/g$) | −35 | −37 | −40 | −43 |
| Toner 6 | Image Density | 0.92 | 0.61 | 0.73 | 0.59 |
| | Fog | bad | bad | bad | bad |
| | Sharpness | bad | bad | bad | bad |
| | Charged Amount ($\mu c/g$) | −30 | −35 | −35 | −38 |
| Toner 7 | Image Density | 1.41 | 0.83 | 1.83 | 0.76 |
| | Fog | good | bad* | good | bad* |
| | Sharpness | good | bad* | good | bad* |
| | Charged Amount ($\mu c/g$) | −20 | −34 | −24 | −24 |

*Vigorous attachment of toner to a non-image area of light-sensitive material.

While the invention has been described in detail and with reference to specific embodiments thereof, it will be apparent to one skilled in the art that various changes and modifications can be made therein without departing from the spirit and scope thereof.

We claim:

1. A color toner composition for an electrostatic developer, comprising a cyan pigment, a magenta pigment or yellow pigment, a binder resin and a negative charging-controlling agent, wherein said binder resin is a vinyl-modified polyester resin as obtained by graft polymerizing
   (b) a vinyl monomer component containing an aromatic vinyl monomer and an amino group-containing vinyl monomer to
   (a) an unsaturated polyester component containing at least aliphatic unsaturated dibasic acid and polyhydric alcohol, said component (a) constituting at least 50% by weight of the vinyl-modified polyester and said amino group-containing vinyl monomer constitutes 0.1 to 2.0% by weight of the vinyl-modified polyester resin, wherein the weight average molecular weight of said component (a) is from 5,000 to 15,000.

2. The color toner composition as claimed in claim 1, wherein said vinyl-modified polyester resin has a weight average molecular weight of 8,000 to 20,000, a melt viscosity at 100° C. of $1 \times 10^4$ to $5 \times 10^5$ poises, and a glass transition temperature of 50° to 80° C.

3. The color toner composition as claimed in claim 1, wherein said unsaturated polyester (a) is 60 to 90% by weight of the vinyl-modified polyester resin.

* * * * *